US009693508B2

(12) United States Patent
Marchildon

(10) Patent No.: US 9,693,508 B2
(45) Date of Patent: Jul. 4, 2017

(54) STRUCTURE FOR GROWING PLANTS IN ROTATABLE MODULES

(75) Inventor: Edward J. Marchildon, Qualicum Beach (CA)

(73) Assignee: Elizabeth A. Storey, British Columbia (CA)

( * ) Notice: Subject to any disclaimer, the term of this patent is extended or adjusted under 35 U.S.C. 154(b) by 480 days.

(21) Appl. No.: 14/348,470

(22) PCT Filed: Sep. 30, 2011

(86) PCT No.: PCT/CA2011/001084
§ 371 (c)(1),
(2), (4) Date: May 20, 2014

(87) PCT Pub. No.: WO2013/044343
PCT Pub. Date: Apr. 4, 2013

(65) Prior Publication Data
US 2014/0325906 A1 Nov. 6, 2014

(51) Int. Cl.
*A01G 31/02* (2006.01)
*A01G 9/02* (2006.01)
*A01G 31/04* (2006.01)

(52) U.S. Cl.
CPC ............ *A01G 9/02* (2013.01); *A01G 31/045* (2013.01); *A01G 31/047* (2013.01); *Y02P 60/216* (2015.11)

(58) Field of Classification Search
CPC ...... A01G 9/02; A01G 31/045; A01G 31/047; A01G 31/06
USPC ..................... 47/60, 62 R, 63, 65, 66.5, 66.6
See application file for complete search history.

(56) References Cited

U.S. PATENT DOCUMENTS

| | | | | | |
|---|---|---|---|---|---|
| 3,284,948 | A | * | 11/1966 | Kyle | A01G 31/042 119/14.03 |
| 3,432,965 | A | * | 3/1969 | Smith | A01G 31/045 47/60 |
| 4,028,847 | A | * | 6/1977 | Davis | A01G 31/042 165/59 |
| 4,068,405 | A | * | 1/1978 | Campbell | A01G 31/045 47/65 |

(Continued)

FOREIGN PATENT DOCUMENTS

| WO | WO 2004/045273 A1 | 3/2004 |
|---|---|---|
| WO | WO 2005/015977 A1 | 2/2005 |

*Primary Examiner* — Peter M Poon
*Assistant Examiner* — Danielle Clerkley
(74) *Attorney, Agent, or Firm* — Nyemaster Goode, P.C.

(57) ABSTRACT

A structure (20) for growing plants comprises an array (22) of containers (24), for example intermodal shipping containers, each having a floor (28) and an open end (30), and being arranged in a plurality of stacked rows (32), each row comprising a plurality of containers. The array defines a space (34) bounded on its sides by the open ends of the containers. Each container holds a plant-growing apparatus (26) of the type having a plurality of rotatable plant-growing modules (52) in which plants grow radially inwardly toward a light source (56) inside the module. The structure (20) includes means (58, 60) for moving the modules along a path within each container and means (74) for removing the modules from the containers and for placing the modules into the containers. The array of containers and the bounded space are covered by a flexible fabric (50) or rigid dome (48).

13 Claims, 5 Drawing Sheets

(56) References Cited

U.S. PATENT DOCUMENTS

| | | | | |
|---|---|---|---|---|
| 4,163,342 | A * | 8/1979 | Fogg | A01G 7/045 47/17 |
| 4,837,971 | A * | 6/1989 | Visser | A01G 9/143 47/17 |
| 5,584,141 | A * | 12/1996 | Johnson | A01G 9/00 47/39 |
| 6,604,321 | B2 | 8/2003 | Marchildon | |
| 6,840,007 | B2 * | 1/2005 | Leduc | A01G 31/02 47/48.5 |
| 7,559,173 | B2 * | 7/2009 | Brusatore | A01G 31/047 47/59 R |
| 7,730,663 | B2 * | 6/2010 | Souvlos | A01G 31/047 47/62 C |
| 8,104,226 | B2 * | 1/2012 | Marchildon | A01G 31/047 47/39 |
| 2004/0111965 | A1 * | 6/2004 | Agius | A01G 31/042 47/62 R |
| 2005/0055878 | A1 * | 3/2005 | Dumont | A01G 31/047 47/62 R |
| 2008/0052987 | A1 * | 3/2008 | Busch | A01G 31/06 47/62 R |
| 2009/0064577 | A1 * | 3/2009 | Lee | A01G 31/047 47/62 R |
| 2011/0192082 | A1 * | 8/2011 | Uchiyama | A01G 9/24 47/66.6 |
| 2011/0232186 | A1 * | 9/2011 | Lewis | A01G 9/00 47/66.6 |

* cited by examiner

STRUCTURE FOR GROWING PLANTS IN ROTATABLE MODULES

FIELD OF THE INVENTION

The invention pertains to the large-scale production of plants using rotatable plant-growing modules.

BACKGROUND OF THE INVENTION

It is known in the art of growing plants hydroponically to use a rotatable drum with an interior lamp, thereby providing for efficient the use of light. Marchildon, U.S. Pat. No. 6,604,321, discloses a rotary plant-growing apparatus with an open-ended cylindrical drum which rotates about a horizontal axis on a support stand. A lamp is positioned at the axis of the drum. The drum holds plant containers, with the plants facing the light and the bottom of the containers extending radially outward from the drum. A trough of water under the drum is spaced from the drum such that the lower part of the containers contacts the water as the drum rotates, watering the plants.

Marchildon, WO 2004/045273, discloses a plant-growing apparatus having a plurality of rotatable plant-growing modules which can be moved around a circuit in the apparatus. Each module comprises a cylindrical structure for holding plant-growing containers in which the plants grow radially inwardly towards a lamp. The modules are supported and rotated in a horizontal position as they are moved.

The present invention is directed to developments in systems for growing plants using rotatable cylindrical structures.

SUMMARY OF THE INVENTION

According to one aspect of the invention, there is provided a structure for the growing of plants, comprising an array of containers, each container having a floor and an open end, the containers being arranged in a plurality of stacked rows, each row comprising a plurality of containers, with the array defining a space bounded on its sides by the open ends of the containers. Each container holds a plant-growing apparatus, each of which comprises a plurality of rotatable plant-growing modules. A module comprises a cylindrical structure for holding plants such that they grow radially inwardly of the cylindrical structure towards a light source inside the cylindrical structure. The plant-growing apparatus has means for rotating the modules, means for moving the modules along a path within a respective container, and means for feeding water to the plants. The plant-growing structure has means such as a fork-lift apparatus for removing the modules from the containers and for placing the modules into the containers, through the open ends thereof. The structure also includes a cover enclosing the array of containers and the bounded space.

These and other features of the invention will be apparent from the following description of specific embodiments, considered along with the accompanying drawings.

DETAILED DESCRIPTION OF THE PREFERRED EMBODIMENTS

Figure 1:
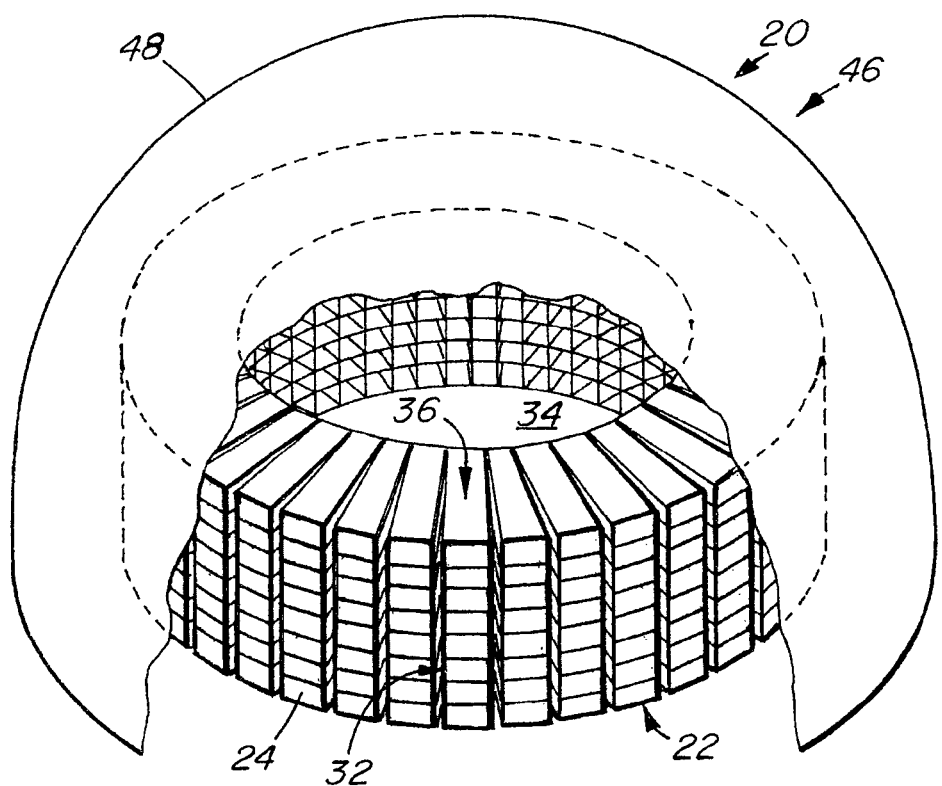
FIG. 1 is an isometric view of the plant-growing structure according to one embodiment of the invention, having a dome cover.

The structure 20 for growing plants comprises an array 22 of containers 24, each of which contains a separate plant-growing apparatus 26. The containers may be standard intermodal shipping containers, in the shape of a parallelepiped, from which the doors have been removed so the containers have a floor 28, an open end 30, a back end 31, a top 33 and two opposed side walls 35. An exemplary container size is 40 feet (12.192 m) long, 8 feet (2.438 m) wide, and 8.5 feet (2.591 m) high (external dimensions).

The containers are arranged in a plurality of stacked rows 32, the rows being circular in plan view and thus defining an interior space 34 bounded by the containers and more particularly by the open ends 30 of the containers. The side walls of adjacent containers within a given row abut each other at the open ends and the back ends 31 opposite to the open ends are spaced apart from each other, as the containers extend radially outwardly of the bounded space 34.

The containers 24 may be stacked such that the containers in each row are vertically aligned, forming columns 36, as in the illustrated embodiment. Alternatively, the containers in each row may be laterally offset relative to the containers in adjacent rows, in brickwork fashion. Alternatively, or in addition to a staggered arrangement, clamps, bolts or other mechanical means may be provided to attach together laterally and vertically adjacent containers, to increase the structural integrity of the array.

Figure 4:
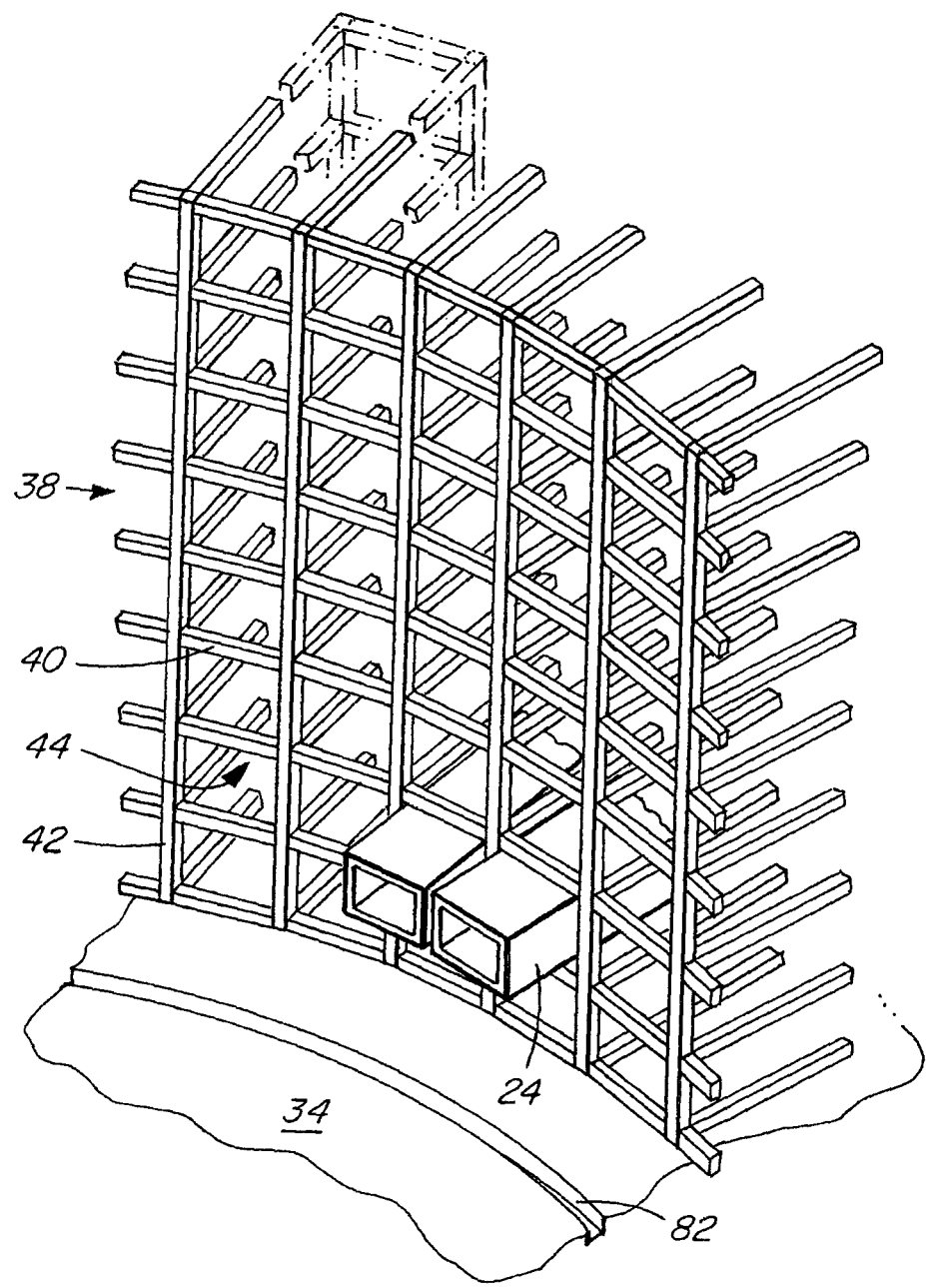
FIG. 4 is an isometric view showing an embodiment of the plant-growing structure employing a frame to support the containers.

Optionally, as shown in FIG. 4, a frame 38 may be provided for holding the containers in the array, with horizontal and vertical frame members 40, 42, defining openings 44 into which the containers are fitted. The use of a frame is preferred for arrays having more than about 12 rows. Either with or without a frame, the structure 20 may comprise hundreds of shipping containers, for example 1,300, or more.

Figure 2:
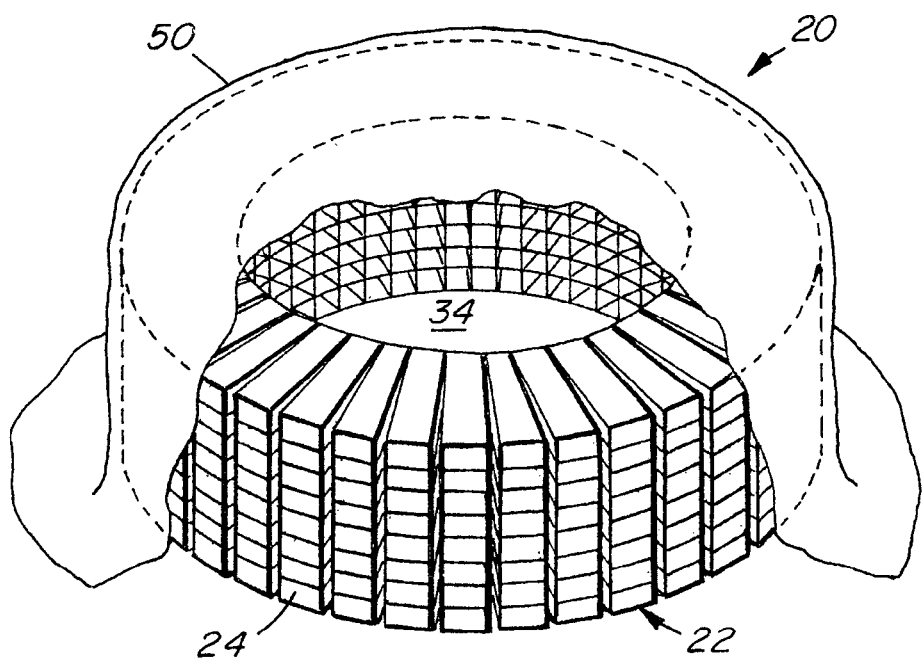
FIG. 2 is an isometric view of another embodiment of the structure, having a fabric cover.
Figure 3:
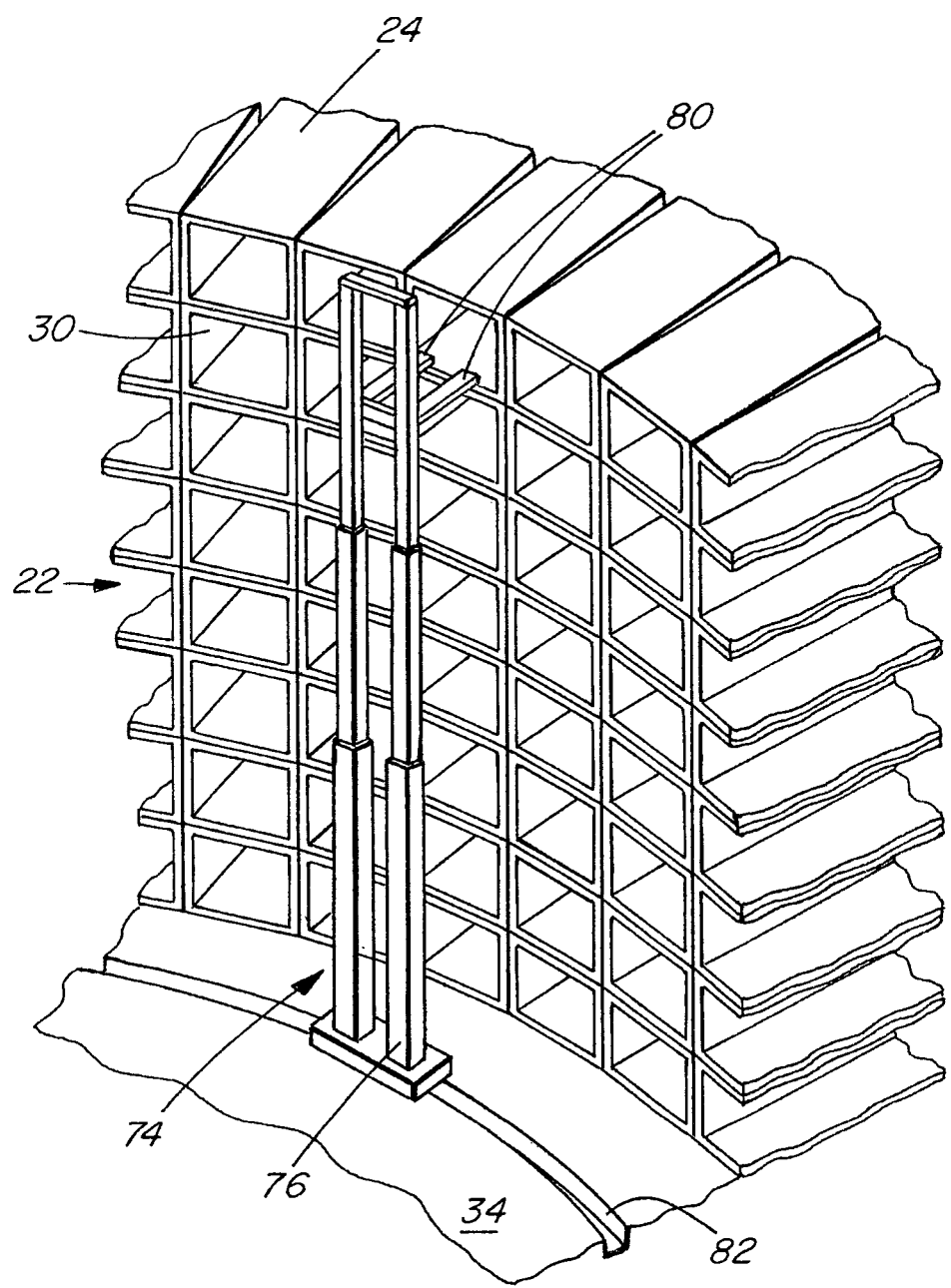
FIG. 3 is an isometric view of a portion of the interior of the structure showing the fork-lift apparatus.

The structure 20 includes a cover 46 over the array and the space 34 bounded by the containers. In one embodiment, as shown in FIG. 1, the cover is a rigid dome or silo 48 which completely covers the array. The dome may contact the array or be spaced from it. In another embodiment, shown in FIG. 2, the cover is a flexible fabric 50 which wraps around the containers and forms a roof over the bounded space 34. The fabric 50 may be supported by the containers or by inflating it under low pressure to maintain it in a domed shape over the array. Support members across the top of the space 34 may be provided to further support the fabric 50.

Figure 5:
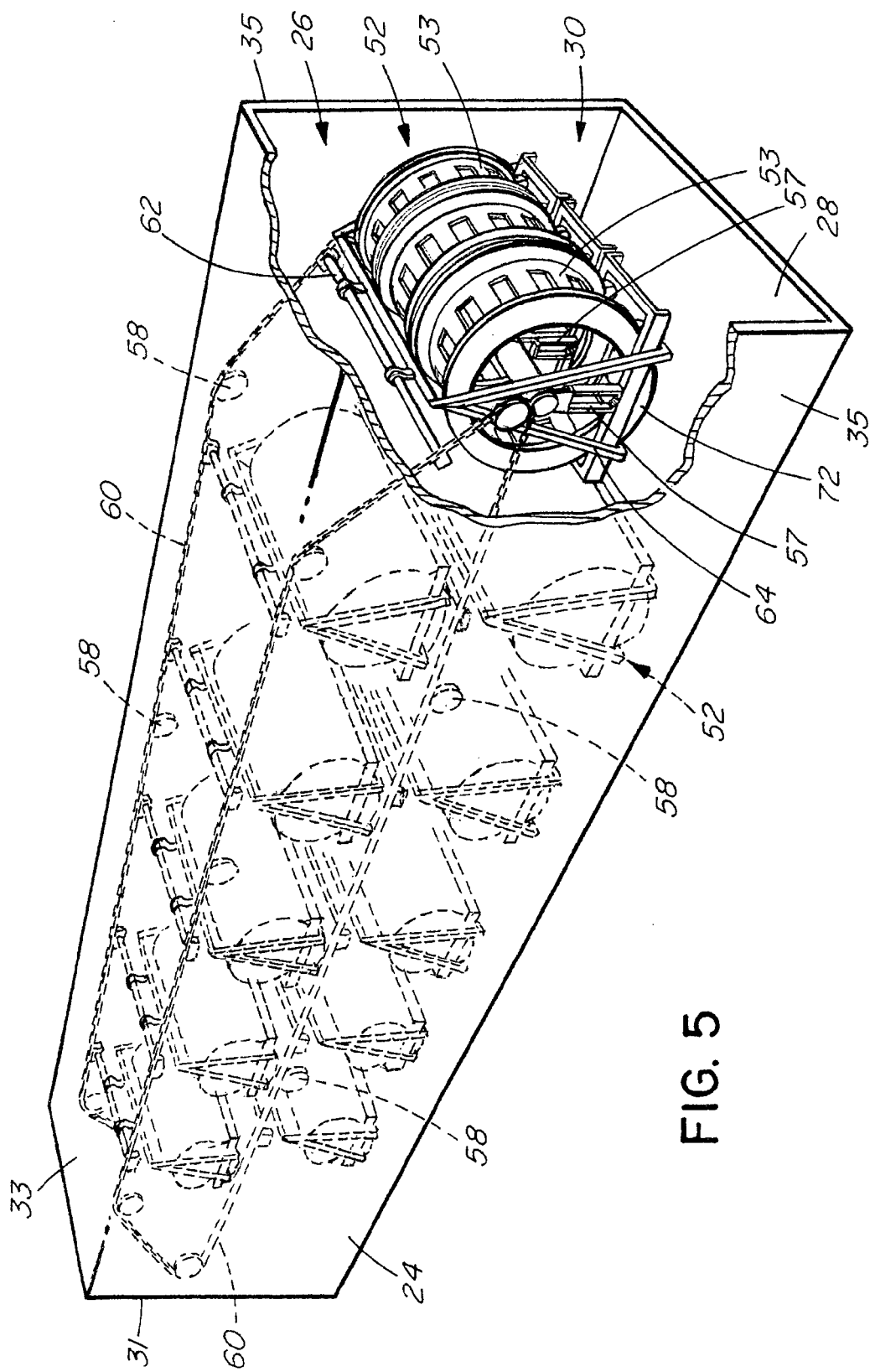
FIG. 5 is an isometric view, partly cut away, of the interior of a container showing a plant-growing apparatus.
Figure 6:
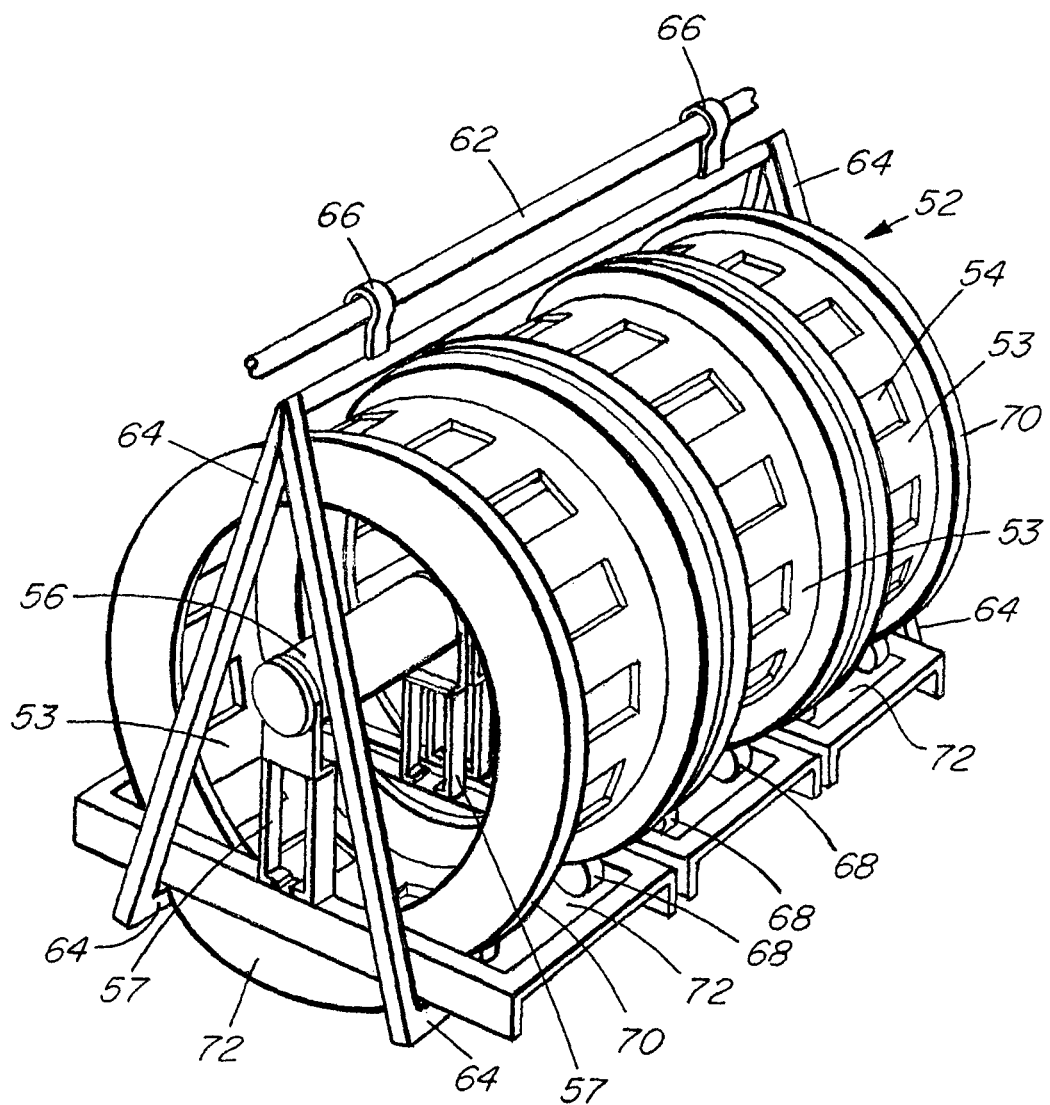
FIG. 6 is an isometric view of a set of modules of the plant-growing apparatus.

As shown in FIGS. 5 and 6, each container holds a plant-growing apparatus 26, which may be of the type disclosed in Marchildon, WO 2004/045273. The apparatus 26 has a plurality of plant-growing modules 52, each of which is a cylindrical structure 53 for holding plant-growing trays such that the plants grow radially inwardly of the cylindrical structure towards a light source inside the cylindrical structure.

The plant-growing apparatus 26 includes means for moving the modules in a path or circuit around the interior of the container. A set of sprockets 58 is mounted on each of the two opposed longitudinal side walls 28 of the container. Chains 60 are operatively fitted on the sprockets and define a closed track on the side walls. Access panels may be provided in the side walls 35 for maintenance access to the tracks. A plurality of module support bars 62 extend between the two chains. A module support frame 64 is hung by hangers 66 from each module support bar. Sprocket drive means comprising a motor and appropriate gear and control means (not shown) are provided to synchronously turn one sprocket in each set.

The rotatable plant-growing modules 52 and water troughs 72 are held by the support frames 64. In the illustrated embodiment three modules 52, each with a water trough, are held in side-by-side arrangement by each support frame 64, with the troughs resting on the lower horizontal members of the frame 64. Alternatively, one or two modules may be held in a support frame. Lamp support members 57 are attached to the outer sides of each trough 72 and hold a lamp 56 which extends longitudinally through each module in a generally axial position. This provides illumination for the plants growing inside the module. The troughs 72 hold rotatable support wheels 68 which engage the rims 70 of the modules. Drive means (not shown) on each trough 72 comprises a motor and appropriate gear and control means to turn the support wheels 68. As the wheels 68 are turned, the modules are rotated about their longitudinal, horizontal axis.

The plant-growing modules 52 may be supported from the chains 60 in ways other than that shown in the illustrated embodiment. For example, in an alternative embodiment of the growing apparatus 26 (not shown), instead of a module support bar 62, a pair of pins is attached to the chains, one on each of the two chains, and the module support frame 64 is hung from the pins by hangers 66 which are located at the top lateral ends of the support frame 64.

Each module 52 is adapted to hold plants so they can grow hydroponically (or aeroponically) and be oriented to grow radially inwardly of the module towards the lamp 56, while their roots grow radially outwardly. The cylindrical structure 53 has openings 54 which are adapted to receive and retain sleeves or trays of growing medium in which plants can grow.

Means are provided for conveying water and nutrients to the plants. In the illustrated embodiment of the apparatus, each module has its own water trough 72, supported by the module support frame 64. The water level in the troughs is maintained to permit water to flow into the plant-growing medium in the containers as they are rotated down into the trough. Alternatively, a single water trough may be positioned on the floor of the container 24 and the watering occurs as the module passes that position in the circuit around the container. Alternatively, the water-feeding means may comprise suitably positioned sprayers, injectors or other convenient means for delivering water and nutrients to the plant-growing medium in each module. If desired, water troughs may be supplemented by sprayers, etc. to ensure that the plants are watered with sufficient frequency.

With plant-growing medium having plant material positioned in the modules 52, the plant-growing apparatus 26 is operated by actuating the lamps and rotating the modules, and by actuating the drive means to rotate the sprockets, moving the chains 60 and with them the support frames 64 and the modules along the circuit within the container. The speed of rotation of each module, and the speed of revolution about the circuit, are selected such that the plants are watered as often as required. The apparatus can be operated continuously or intermittently and in either direction of travel of the chains. Where each module has its own water trough 72, it is not necessary to move the modules around the circuit in the container to achieve watering of the plants, and the sprockets would be driven only to bring the modules into position for servicing or for refilling the troughs.

To service the modules, for example to harvest the plants or do maintenance and repair, the drive means for moving the modules around the circuit is stopped when the module to be serviced is in a position adjacent to the open end 30 of the container, at which point it can be removed from the container, as described below.

A fork-lift apparatus 74 in the bounded space 34 is used to remove modules from the containers 24 and to place fresh modules into the containers. The fork-lift apparatus comprises a tower 76 having a fork-lift mechanism operated by suitable control means, capable of inserting two lift arms 80 into a container through the open end, engaging a module support frame 64 and lifting it, with its set of modules, and removing them from the container. The support frame and modules are carried to ground level where the modules can be removed from the module support frame for harvesting of the plants from the modules. Replacement modules, with fresh plant material, are loaded onto the support frame and the fork-lift apparatus carries them to the container and places them in the container through the open end, hanging the support frame 64 onto the module support bar 62. The sprockets are then operated to bring another group of modules into position by the open end 30 for removal.

The fork-lift apparatus 74 operates on a track 82 which extends around the bounded space so that the tower can be brought within operating distance of all the containers. Depending on the size of the array and the number of containers, two or more fork-lift apparatuses may be required. They may be operated robotically to service all the containers, and all modules within a container, according to a programmed schedule.

The interior of the plant-growing structure 20, that is, the bounded space 34 and the interior of the containers 24, may be at atmospheric pressure or at a pressure about atmospheric, for example 1.25 atmospheres. It is believed that pressures above atmospheric promote faster plant growth, due to a higher concentration of oxygen. Where the structure is pressurized, air locks are provided for ingress and egress of personnel and modules. For example, the modules would be removed to a de-pressurized location for harvesting and replanting. The cover of the structure 20 may be the rigid dome 48 or a silo rather than the flexible fabric 50 where the interior is intended to be pressurized, though the flexible fabric may be used for low pressure installations.

The structure 20 also includes: air pumps and conduits whereby air may be blown into each container; water pumps and conduits for delivering water to the containers; means for providing electric power to the lamps 56 and to the motors for rotating the modules about their axis and for moving the modules around the circuit within each container. The power for any of these may be provided by batteries. The structure 20 also includes a controller (not shown) such as a PLC (programmable logic computer) to operate the system, including the plant-growing apparatuses, the fork-lift apparatus, the air pumps and the water pumps. The modules may be tagged with radio-frequency identification (RFID) labels to facilitate automation of the operation of the structure.

In an alternative embodiment of the container 24, the container does not need to be closed by panels on its top, back end and opposed sides in order to contain a plant-growing apparatus and it may comprise a frame which defines these faces but one or more of the faces themselves may be open, that is, not closed, or completely closed, by wall panels. For example, the back end 31 may be open. Whether or not these faces of the container are open or are closed by panels, the containers must have sufficient structural integrity to hold the plant-growing apparatus and be stacked.

Where a component is referred to above, unless otherwise indicated, reference to that component (including reference to a means) should be interpreted as including as equivalents of that component any component which performs the same function as the described component.

As will be apparent to those skilled in the art in the light of the foregoing disclosure, many alterations and modifications are possible in the practice of the invention without departing from the scope thereof. Accordingly, the scope of the invention is to be construed in accordance with the following claims.

The invention claimed is:

1. A structure for the growing of plants, comprising:
   a cylindrically-arranged array of containers, each container having a floor, a top, an open end, a back end, and two opposed sides extending between the open end and the back end, the containers being arranged in a plurality of stacked rows, each row comprising a plurality of containers, the cylindrically-arranged array having an inner bounded space defined by a central area surrounded by the open ends of the containers;
   each container holding a plant-growing apparatus, each plant-growing apparatus comprising:
   (i) a plurality of rotatable plant-growing modules, each module comprising a cylindrical structure for holding plants such that the plants grow radially inwardly of the cylindrical structure toward a light source inside the cylindrical structure;
   (ii) means for rotating the modules;
   (iii) means for moving the modules along a path within a respective container; and
   (iv) means for feeding water to the plants in the respective container;
   means for removing the modules from the containers and for placing the modules into the containers, through the open ends thereof; and
   a cover enclosing the array of containers and the inner bounded space.

2. A structure according to claim 1, wherein one or more of the top, the back end and the two opposed sides comprise walls.

3. A structure according to claim 1, wherein the container is a parallelepiped having five closed sides, one of which is the floor, and the open end.

4. A structure according to claim 1, wherein the inner bounded space and the interior of the containers are at atmospheric pressure.

5. A structure according to claim 1, wherein the inner bounded space and the interior of the containers are at a pressure greater than atmospheric pressure.

6. A structure according to claim 1, wherein the cover comprises a rigid cover.

7. A structure according to claim 1, wherein the cover comprises a flexible fabric.

8. A structure according to claim 1, wherein the means for removing and for placing the modules is a module-handling machine inside the inner bounded space.

9. A structure according to claim 1, wherein the path forms a closed circuit and the modules can be conveyed in a revolution around the circuit within a respective container.

10. A structure according to claim 1, wherein the open ends of adjacent containers within a given row substantially abut each other and back ends of containers opposite to the open ends are spaced apart from each other.

11. A structure according to claim 1, further comprising a frame holding the containers in the array.

12. A structure according to claim 1, further comprising means for blowing air into the containers.

13. A structure according to claim 1, wherein the containers are intermodal shipping containers.

* * * * *